United States Patent
Piedmont

(10) Patent No.: US 8,834,147 B2
(45) Date of Patent: Sep. 16, 2014

(54) MECHANICALLY COLLAPSIBLE SHELL FOR LONG CYLINDER PRODUCTION

(75) Inventor: Gregory Henry Piedmont, Helendale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 307 days.

(21) Appl. No.: 13/115,077

(22) Filed: May 24, 2011

(65) Prior Publication Data

US 2012/0299215 A1 Nov. 29, 2012

(51) Int. Cl.
- B29C 33/44 (2006.01)
- B29C 33/48 (2006.01)
- B29C 37/00 (2006.01)
- B29L 23/00 (2006.01)

(52) U.S. Cl.
CPC .......... B29C 37/0017 (2013.01); B29C 33/444 (2013.01); B29C 33/485 (2013.01); B29L 2023/22 (2013.01)
USPC ............ 425/438; 264/334; 264/257; 264/241

(58) Field of Classification Search
USPC ......................................... 425/438; 264/334
See application file for complete search history.

(56) References Cited

U.S. PATENT DOCUMENTS

| 3,265,795 | A | 8/1966 | Medney |
| 3,937,412 | A | 2/1976 | Damour |
| 3,988,103 | A | 10/1976 | Hoffmeister |
| 4,233,020 | A | 11/1980 | Oswald |
| RE30,654 | E | * 6/1981 | Dittmann et al. ............. 425/438 |
| 4,278,490 | A | 7/1981 | Pistole et al. |
| 4,310,138 | A | 1/1982 | Johnston |
| 4,898,702 | A | * 2/1990 | Elkins et al. .................. 264/145 |
| 5,259,901 | A | 11/1993 | Davis et al. |
| 5,433,418 | A | 7/1995 | Nowak et al. |

(Continued)

FOREIGN PATENT DOCUMENTS

| JP | 11225623 A | * 8/1999 |
| JP | 2008-062471 | 3/2008 |
| WO | WO 99/14024 | 3/1999 |

OTHER PUBLICATIONS

Part Details Review on Bayer Material Science website, retrieved Sep. 18, 2009.*

(Continued)

*Primary Examiner* — Larry Thrower
*Assistant Examiner* — Xue Liu
(74) *Attorney, Agent, or Firm* — McDermott Will & Emery LLP

(57) ABSTRACT

A system for removing a cured composite object from a mandrel is provided. The system includes a collapsible shell, wherein an inner surface of the shell is configured to slide over an outer surface of the mandrel and an outer surface of the shell is configured to have the composite object formed thereon. The system further includes an extractor comprising a first and second disk disposed along a rod, and an adjuster, wherein the second disk is configured to engage an end of the mandrel and the adjuster is configured to move the first disk along the rod relative to the second disk. The system further includes a spacer configured to fit between the first disk and a first end of the shell when the shell is placed on the mandrel. The spacer pushes the shell and the composite object formed thereon off of the mandrel when the adjuster moves the first disk towards the second disk.

20 Claims, 5 Drawing Sheets

(56) References Cited

U.S. PATENT DOCUMENTS

| | | |
|---|---|---|
| 6,189,723 B1 | 2/2001 | Davis et al. |
| 7,422,714 B1 | 9/2008 | Hood et al. |
| 2003/0154582 A1* | 8/2003 | Nakamura ............... 29/2.15 |
| 2005/0230552 A1 | 10/2005 | Engwall et al. |
| 2010/0075074 A1* | 3/2010 | Wilson et al. ............ 428/34.1 |
| 2010/0139850 A1 | 6/2010 | Morris et al. |
| 2010/0155984 A1 | 6/2010 | Hollensteiner et al. |
| 2010/0232973 A1 | 9/2010 | Callis et al. |

OTHER PUBLICATIONS

English abstract of JP11-225623.*

* cited by examiner

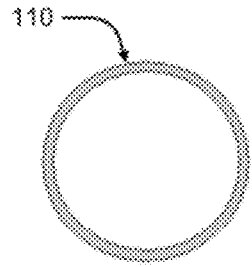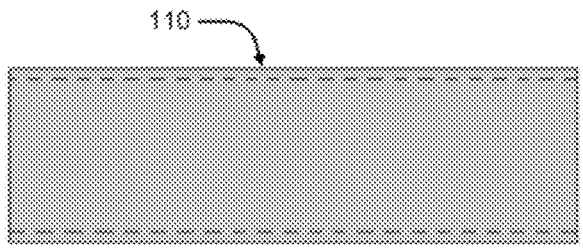
FIG. 1A  FIG. 1B
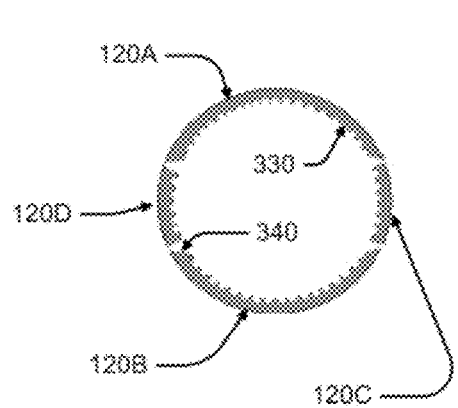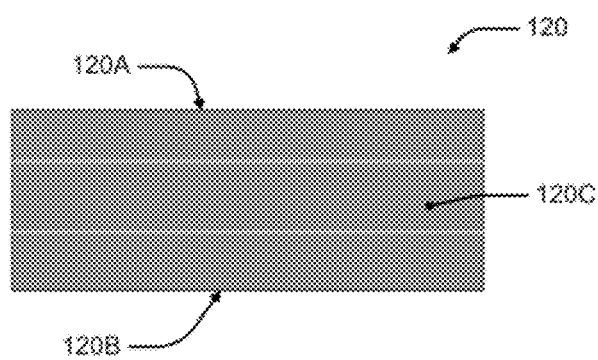
FIG. 2A  FIG. 2B
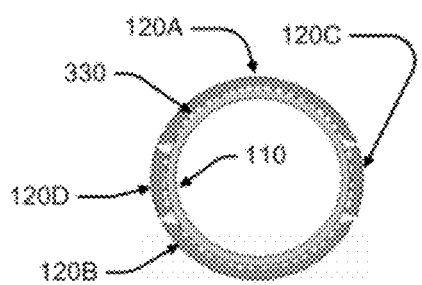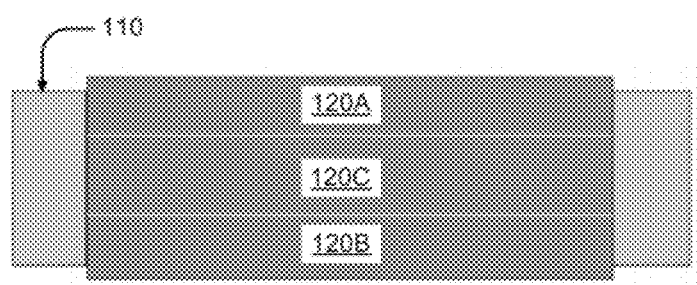
FIG. 3A  FIG. 3B

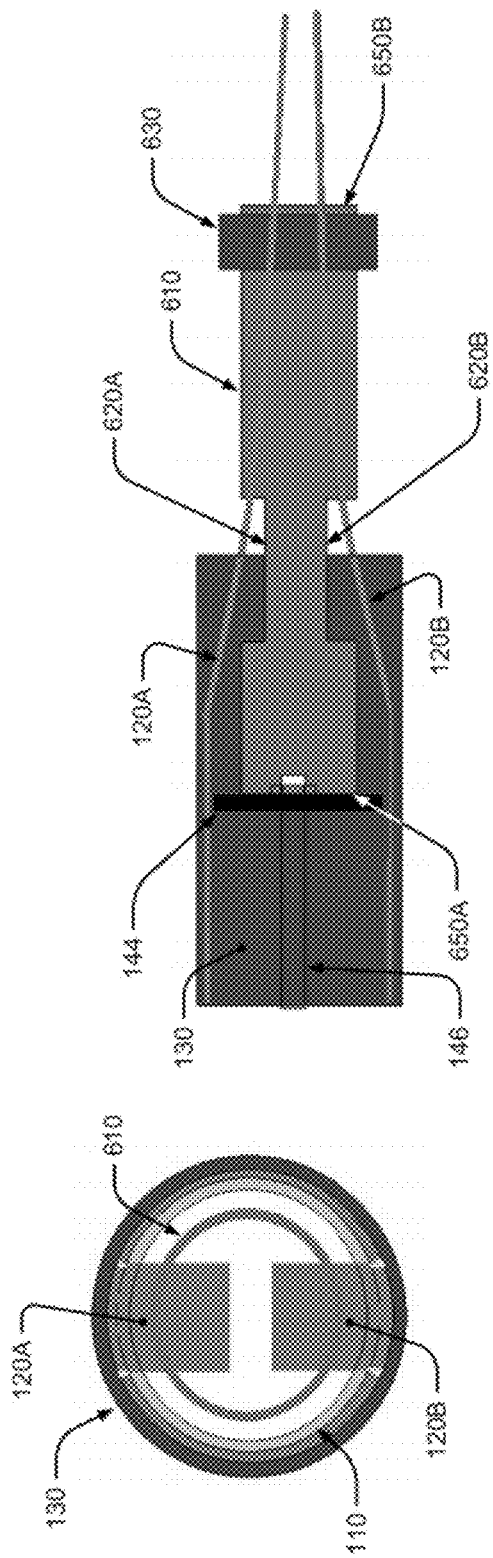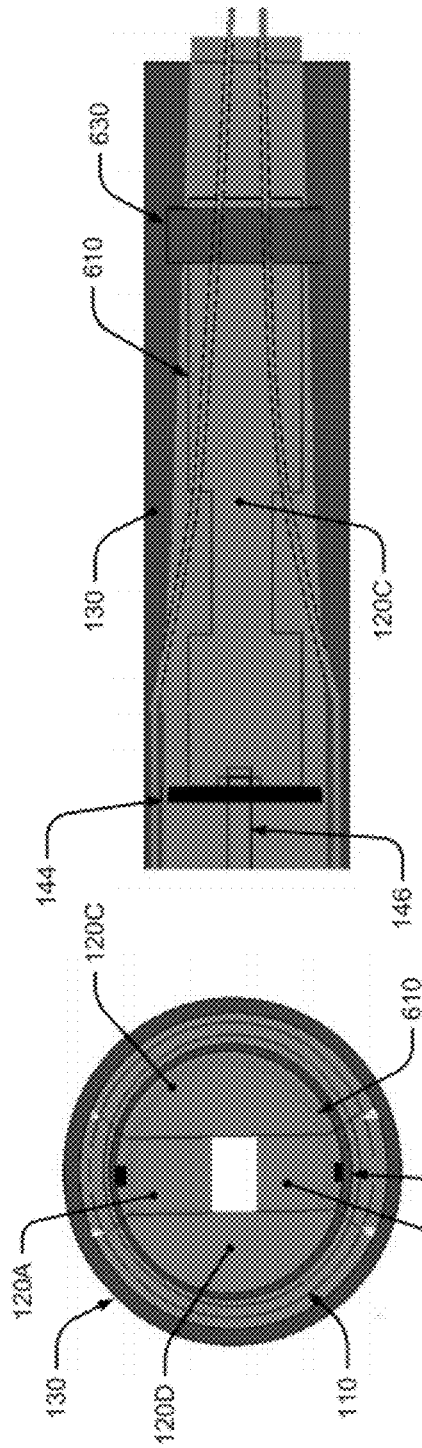

MECHANICALLY COLLAPSIBLE SHELL FOR LONG CYLINDER PRODUCTION

STATEMENT AS TO RIGHTS TO INVENTIONS MADE UNDER FEDERALLY SPONSORED RESEARCH OR DEVELOPMENT

Not Applicable.

FIELD

The present invention generally relates to systems and methods for manufacturing composite objects and, in particular, relates to systems and methods for manufacturing long cylindrical composite objects.

BACKGROUND

In fabricating composite objects of generally three feet or longer, using a mandrel to form the composite object often leads to difficulties relating to the removal of the cured composite object from the mandrel. For example, debris particles between the composite object and the mandrel typically cause cumulative debris lock, essentially locking the composite object and mandrel together. In certain circumstances, the debris particles are microscopic in size and may break loose and roll along between the composite object and the mandrel. The further the composite object is moved along the mandrel, the more debris builds up until the composite object is locked to the mandrel. Thereafter, the more force that is applied, the stronger the debris lock becomes until eventually the composite object itself fails.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to various aspects of the subject technology, systems and methods for removing a cured composite object from a mandrel is provided that solves some or all of the foregoing problems. In some aspects, the system provides a cost-effective method for removing the cured composite object from the mandrel by forming the composite object on a collapsible shell disposed on the mandrel and mechanically collapsing the collapsible shell as the collapsible shell and composite object formed thereon are removed from the mandrel. In another aspect, the system provides a method for manufacturing composite objects with a zero, negative, or positive draft angle by using an outer surface of the collapsible shell as a molding surface. In other aspects, the system provides a method for manufacturing composite objects of varying shape, length, or diameter by modifying the dimensions of the collapsible shell. In some aspects, the system prevents cumulative debris lock by mechanically collapsing the shell away from the cured composite object.

In accordance with one aspect of the subject technology, a system for removing a cured composite object from a mandrel is provided. The system comprises a collapsible shell, wherein an inner surface of the shell is configured to slide over an outer surface of the mandrel and an outer surface of the shell is configured to have the composite object formed thereon. The system further comprises an extractor comprising a first and second disk disposed along a rod, and an adjuster, wherein the second disk is configured to engage an end of the mandrel and the adjuster is configured to move the first disk along the rod relative to the second disk. The system further comprises a spacer configured to fit between the first disk and a first end of the shell when the shell is placed on the mandrel. The spacer pushes the shell and the composite object formed thereon off of the mandrel when the adjuster moves the first disk towards the second disk.

According to another aspect of the subject technology, a method for removing a cured composite object from a mandrel is provided. The method comprises disposing a collapsible shell on an outer surface of the mandrel. The method further comprises forming the composite object on an outer surface of the shell and inserting an extractor through the mandrel. The extractor comprises a first and second disk disposed along a rod, and an adjuster, wherein the second disk is configured to engage an end of the mandrel, and the adjuster is configured to move the first disk along the rod relative to the second disk. The method further comprises disposing a spacer between the first disk and a first end of a shell. The method further comprises moving the first disk along the rod towards the second disk using the adjuster such that the spacer pushes the shell and the composite object formed thereon off of the mandrel.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 1A illustrates a front view of a mandrel, in accordance with various aspects of the subject technology.

FIG. 1B illustrates a side view of a mandrel, in accordance with various aspects of the subject technology.

FIG. 2A illustrates a front view of a collapsible shell, in accordance with various aspects of the subject technology.

FIG. 2B illustrates a side view of a collapsible shell, in accordance with various aspects of the subject technology.

FIG. 3A illustrates a front view of a mandrel and a collapsible shell, in accordance with various aspects of the subject technology.

FIG. 3B illustrates a side view of a mandrel and a collapsible shell, in accordance with various aspects of the subject technology.

FIG. 6A illustrates a front view of a disassembly sleeve, in accordance with various aspects of the subject technology.

FIG. 6B illustrates a side view of a disassembly sleeve, in accordance with various aspects of the subject technology.

FIG. 6C illustrates a front view of a disassembly ring, in accordance with various aspects of the subject technology.

FIG. 6D illustrates a side view of a disassembly ring, in accordance with various aspects of the subject technology.

DETAILED DESCRIPTION

Figures 4A, 4B:
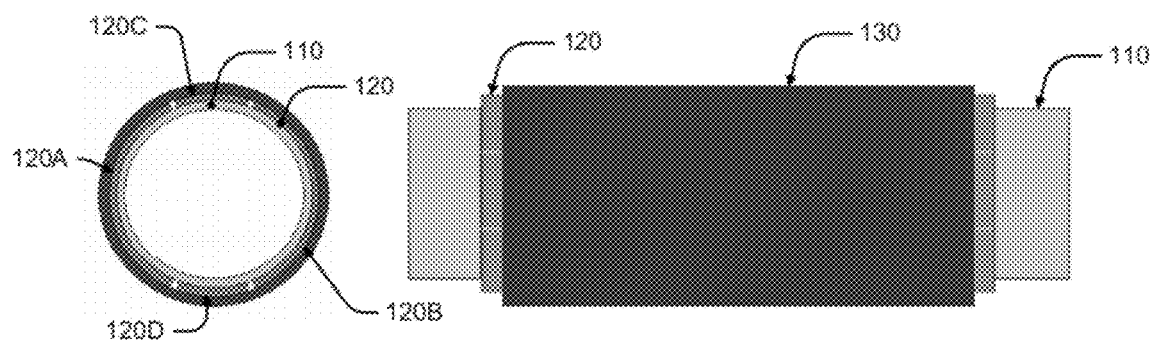
FIG. 4A illustrates a front view of a mandrel, a collapsible shell, and a composite object, in accordance with various aspects of the subject technology.
FIG. 4B illustrates a side view of a mandrel, a collapsible shell, and a composite object, in accordance with various aspects of the subject technology.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

Various aspects of the subject technology provide systems and methods for removing a cured composite object from a mandrel is provided that solves some or all of the foregoing problems. In some aspects, the system provides a cost-effective method for removing the cured composite object from the mandrel by forming the composite object on a collapsible shell disposed on the mandrel and mechanically collapsing the collapsible shell as the collapsible shell and composite object formed thereon are removed from the mandrel. In another aspect, the system provides a method for manufacturing composite objects with a zero, negative, or positive draft angle by using an outer surface of the collapsible shell as a molding surface. In other aspects, the system provides a method for manufacturing composite objects of varying shape, length, or diameter by modifying the dimensions of the collapsible shell. In some aspects, the system prevents cumulative debris lock by mechanically collapsing the shell away from the cured composite object.

According to one aspect of the subject technology, the cured composite object may be utilized as a spar tube for ultra light weight wings of an aircraft. In another aspect, the cured composite object may be utilized as a trailing edge for the control surfaces of a large airship which may, for example, include a blimp. In one aspect, the cured composite object may be utilized within airframe structures as a stiffening member. In some aspects, the cured composite object may have a long length which may, for example, be a length of about three feet, five feet, seven feet, nine feet, 15 feet, 20 feet, 30 feet, 40 feet, or 50 feet.

According to one aspect of the subject technology, the composite object may comprise a braided triaxial fabric which may, for example, include Toray T-300 1K. In another aspect, the composite object may comprise a plain weave prepreg fabric which may, for example, include cT700S-12K-50C. In one aspect, the composite object 130 may comprise a unidirectional tape which may, for example, include MTM45-1/IM7-GP-145.

FIGS. 1A and 1B illustrate views of a mandrel 110, in accordance with various aspects of the subject technology. In some aspects, the mandrel 110 is configured as a supporting member for a collapsible shell 120 (shown in FIGS. 2A and 2B). The mandrel 110 may comprise a strong and rigid material, such as a steel alloy, aluminum, or carbon. In another aspect, the mandrel 110 may comprise different cross sections, such as a circular, square, or rectangular cross section or other known cross sectional shape in the art. For example, the cross section of the mandrel 110 may comprise a diameter of about 4 inches, 5 inches, 10 inches, or 15 inches. In one aspect, the mandrel 110 may comprise about a zero draft angle. In some aspects, the outer surface of the mandrel 110 may have a polished and smooth surface to facilitate a slidable interaction with the collapsible shell 120.

FIGS. 2A and 2B illustrate views of the collapsible shell 120, in accordance with various aspects of the subject technology. In one aspect, the collapsible shell 120 has a length equal to or shorter than the length of the mandrel 110. In some aspects, the collapsible shell 120 may comprise a flexible or semi-flexible material, such as plastic, rubber, or other material capable of withstanding temperatures of about 250° F. or 400° F. In some aspects, the collapsible shell 120 may comprise two or more generally cylindrical longitudinal sections. For example, the collapsible shell 120 may comprise a first shell section 120A, a second shell section 120B, a third shell section 120C, and a fourth shell section 120D. In one aspect, the shell sections 120A-D may be configured to have different sizes. For example, the first and second shell sections 120A and 120B may have wider widths than the third and four shell sections 120C and 120D. In another aspect, the shell sections 120A-D may be configured to prevent interference between adjacent edges of the shell sections 120A-D when the collapsible shell 120 is collapsed, as further discussed below. For example, each shell section 120A-D may comprise two or more beveled longitudinal edges 340 so that the edges of the shell section 120A-D do not interfere with edges of adjacent shell sections upon disassembly and/or collapse of the shell sections 120A-D.

FIGS. 3A and 3B illustrate views of the mandrel 110 and the collapsible shell 120, in accordance with various aspects of the subject technology. In one aspect, the shell sections 120A-D are configured to be positioned on the outer surface of the mandrel 110. For example, the shell sections 120A-D may comprise an inner diameter equal to or larger than the outer diameter of the mandrel 110. In another aspect, the shell sections 120A-D comprise an inner surface of the collapsible shell 120 that may be configured to slide over an outer surface of the mandrel 110. In one aspect, the inner surface of the collapsible shell 120 may be configured to reduce a friction force between the inner surface of the collapsible shell 120 and the outer surface of the mandrel 110. For example, the inner surface of the shell sections 120A-D may be configured with a plurality of channels 330 that are configured to reduce a contact surface area between the collapsible shell 120 and the mandrel 110.

FIGS. 4A and 4B illustrate views of the mandrel 110, the collapsible shell 120, and the composite object 130, in accordance with various aspects of the subject technology. In another aspect, the shell sections 120A-D may comprise an outer surface of the collapsible shell 120 that is configured to have the composite object 130 formed thereon. For example, the shell sections 120A-D may be disposed on the outer surface of the mandrel 110 and held in place, in order to create a mold surface for lay-up of the composite fabric. The shell sections 120A-D may be held in place on the outer surface of the mandrel with temporary adhesive, tape, or wrap. In some aspects, the outer surface of the collapsible shell 120 may comprise a wide variety of features which would otherwise not be possible on convention mandrels because of the requirement that conventional mandrels maintain a zero or negative draft angle. For example, by utilizing the outer surface of the collapsible shell 120 as the mold surface, the mold surface may comprise a positive draft angle or a perpendicular protrusion, so long as the inner surface of the collapsible shell 120 maintains about a zero draft angle.

Figure 5A:
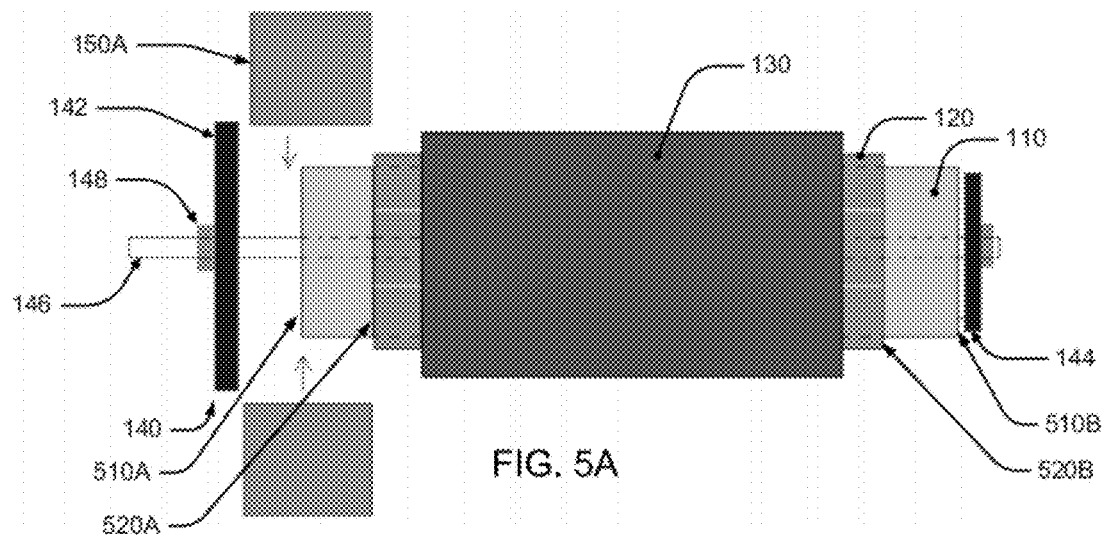
FIG. 5A illustrates an example for removing a cured composite object from a mandrel, in accordance with various aspects of the subject technology.
Figure 5B:
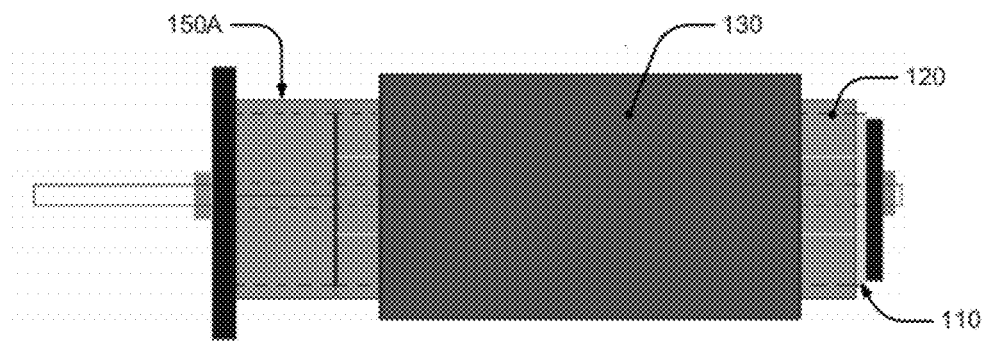
FIG. 5B illustrates an example for removing a cured composite object from a mandrel, in accordance with various aspects of the subject technology.
Figure 5C:
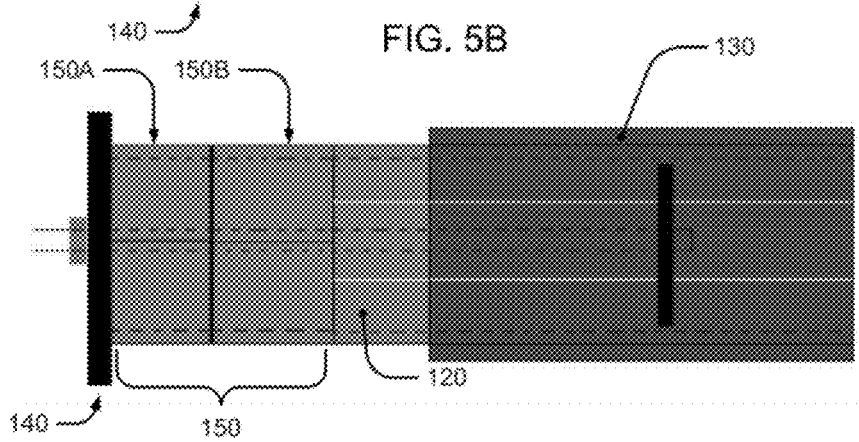
FIG. 5C illustrates an example for removing a cured composite object from a mandrel, in accordance with various aspects of the subject technology.

FIGS. 5A, 5B, and 5C illustrate an example a technique for removing the cured composite object 130 from the mandrel 110, in accordance with various aspects of the subject technology. In one aspect, an extractor 140 is configured to push the collapsible shell 120 and cured composite object 130 off of the mandrel 110. In some aspects, the extractor 140 may comprise a first and second disk 142 and 144 and a rod 146, wherein the first disk 142 is disposed at a proximal portion on the rod 146 and the second disk 144 is secured to a distal end of the rod 146. The extractor 140 may be inserted through the mandrel 110 such that the rod 146 extends through the mandrel 110, the second disk 144 abuts a distal end 510B of the mandrel 110, and the first disk 142 is disposed proximal to a proximal end 510A of the mandrel 110. The extractor 140 also comprises an adjuster 148 configured to adjust the position of the first disk 142 along the rod 146. In one aspect, the adjuster 140 may be adjusted to create a space between the first disk 142 and a proximal end 520A of the collapsible shell 120 so that a spacer 150A can be disposed between the first disk 142 and the proximal end 520A of the collapsible shell 120. After the spacer 150A is disposed between the first disk 142 and the collapsible shell 120, the adjuster 148 may be adjusted to move the first disk 142 towards the second disk 144 abutting the distal end 510B of the mandrel 110 to push the spacer 150A toward the second disk 144. This movement causes the spacer 150A to push the collapsible shell 120 and the cured composite object 130 off of the mandrel 110, as further discussed below.

In one aspect, the rod 146 has a longitudinal length equal to or greater than the cumulative longitudinal length of the mandrel 110 and the collapsible shell 120. In another aspect, the adjuster 148 may comprise a male and female threaded engagement wherein the female threads comprise a threaded portion on the rod 146 with a threaded length. The threaded length on the rod 146 may be equal to or greater than the longitudinal length of the collapsible shell 120. In some aspects, the male threads of the adjuster 148 may be disposed on the first disk 142. Although in this example the adjuster 148 comprises a threaded engagement, it should be understood that other methods for adjustably positioning the first disk 142 along the rod 146 may be utilized, such as for example, incorporating locking shaft collars. In some aspects, the adjuster 148 may be used to adjust the position of the first disk 142 on the rod 146 relative to the second disk 144.

In one aspect, the first disk 142 may be configured to abut and push the spacer 150A as the adjuster 148 moves the first disk 142 toward the second disk 144 along the rod 146. In another aspect, the first disk 142 has a diameter larger than the outer diameter of the mandrel 110 to allow the spacer 150A to abut against a surface of the first disk 142.

In one aspect, the second disk 144 may be configured to abut the distal end 510B of the mandrel 110. In another aspect, the second disk 144 may be configured not to interfere with the collapsible shell 120 as the collapsible shell 120 is pushed off of the mandrel 110. For example, the second disk 144 may comprise an outer diameter that is larger than the inner diameter of the mandrel 110, but smaller than the outer diameter of the mandrel 110. In some aspects, the second disk 144 is mechanically fixed or chemically bonded to the distal end of the rod 146. In another aspect, the second disk 144 may be configured with an alignment sleeve to align the second disk 144 to the mandrel 110. For example, the alignment sleeve may comprise an outer diameter equal to or smaller than the inner diameter of the mandrel 110, wherein the alignment sleeve is attached to the second disk 144 such that insertion of the alignment sleeve into the mandrel 110 positions the second disk 144 onto the distal end 510B of the mandrel 110.

In one aspect, the spacer 150A may comprise two semicircular sections, configured to be disposed on the outer surface of the mandrel 110 between the first disk 142 and the proximal end 520A of the collapsible shell 120. In some aspects, the spacer 150A is configured to push the collapsible shell 120 and the cured composite object 130 formed thereon off of the mandrel 110 as the adjuster 148 moves the first disk 142 toward the second disk 144. In some aspects, the spacer 150A may comprise an inner diameter equal to or larger than the outer diameter of the mandrel 110. In some aspects, the spacer 150 may comprise a plurality of spacers, 150A and 150B, as shown in the example in FIG. 5C.

FIGS. 6A and 6B illustrate views of a disassembly sleeve 610, in accordance with various aspects of the subject technology. In one aspect, the disassembly sleeve 610 is configured to remove the collapsible shell 120 from the cured composite object 130 as the collapsible shell 120 and the cured composite object 130 formed thereon are pushed off of the mandrel 110 by the extractor 140 and the spacer 150. In some aspects, the disassembly sleeve 610 comprises a tubular structure with a proximal end 650A and a distal end 650B. The proximal end 650A is configured to engage the second disk 144. For example, the proximal end 650A of the disassembly sleeve 610 may be mechanically fastened or chemically bonded to the second disk. In one aspect, the disassembly sleeve 610 may be configured with a first and second opening 620A and 620B. The first and second openings 620A and 620B may be configured to receive the third and fourth shell sections 120C and 120D, respectively. The first and second openings 620A and 620B may be further configured to pull the third and fourth shell sections 120C and 120D, respectively, toward the center of the disassembling sleeve 610 and away from the cured composite object 130 as the collapsible shell 120 is pushed off of the mandrel 110.

In one aspect, the third and fourth shell sections 120C and 120D may first be bent and inserted into the first and second openings, 620A and 620B, respectively, after a portion of the collapsible shell 120 has been pushed off of the mandrel 110. As the collapsible shell 120 and the cured composite object 130 formed thereon are pushed off of the mandrel 110 by the extractor 140 and the spacer 150, the third and fourth shell sections 120C and 120D are simultaneously fed into the first and second openings 620A and 620B, respectively, of the disassembly sleeve 610. Accordingly, as the third and fourth shell sections 120C and 120D are simultaneously fed into the first and second openings 620A and 620B, respectively, the third and fourth shell sections 120C and 120D are separated from the cured composite object 130. In some aspects, contact edges of the first and second openings 620A and 620B are rounded or chamfered, to prevent damage to the shell sections. In one aspect, the distal end of the disassembly sleeve 610 may be configured with an opening to allow the third and fourth shell sections 120C and 120D to exit the disassembly sleeve 610 and thereby further facilitate removal of the collapsible shell 120 from the composite object 130. For example, the distal end of the disassembly sleeve 610 may have a large enough opening to provide sufficient clearance between the disassembly sleeve 610 and the third and fourth shell sections 120C and 120D.

FIGS. 6C and 6D illustrate views of a disassembly ring 630 disposed at a distal portion of the disassembly sleeve 610, in accordance with various aspects of the subject technology. The disassembly ring 630 may be configured to receive the first and second shell sections 120A and 120B respectively. For example, the disassembly ring 630 may have an inner diameter that is larger than the outer diameter of the disassembly sleeve 610 and an outer diameter that is smaller than the inner diameter of the cured composite object 130. In some aspects, a space is formed between the inner diameter of the disassembly ring 630 and the outer diameter of the disassembly sleeve 610 for receiving the first and second shell sections 120A and 120B. In one aspect, spacers are disposed between the disassembly ring 630 and the disassembly sleeve 610 to maintain the position of the disassembly ring 630 relative to the disassembly sleeve 610. In one aspect, the disassembly ring 630 may be configured to pull the first and second shell sections 120A and 120B away from the cured composite object 130 as the collapsible shell 120 is pushed off of the mandrel 110. In this example, the first and second shell sections, 120A and 120B may be bent and inserted into the space between the disassembly ring 630 and the disassembly sleeve 610 after a portion of the collapsible shell 120 has been pushed off of the mandrel 110. As the collapsible shell 120 and the cured composite object 130 formed thereon are pushed off of the mandrel 110 by the extractor 140 and the spacer 150, the first and second shell sections 120A and 120B are simultaneously fed into the space between the disassembly ring 630 and the disassembly sleeve 610. Accordingly, as the first and second shell sections 120A and 120B are simultaneously fed into the space between the disassembly ring 630 and the disassembly sleeve 610, the collapsible shell 120 is separated from the cured composite object 130. In some aspects, a contact edge of the disassembly ring 630 is rounded or chamfered to prevent damage to the shell sections.

In another aspect, the disassembly sleeve 610 may be configured with a third and fourth opening to receive the first and second shell sections 120A and 120B, respectively, of the collapsible shell 120. In this aspect, the third and fourth opening may be configured to pull the first and second shell sections 120 and 120B, respectively, away from the cured composite object 130 as the collapsible shell 120 and the cured composite object 130 formed thereon are pushed off of the mandrel 110 in a similar manner as the first and second opening discussed above.

Figure 7:
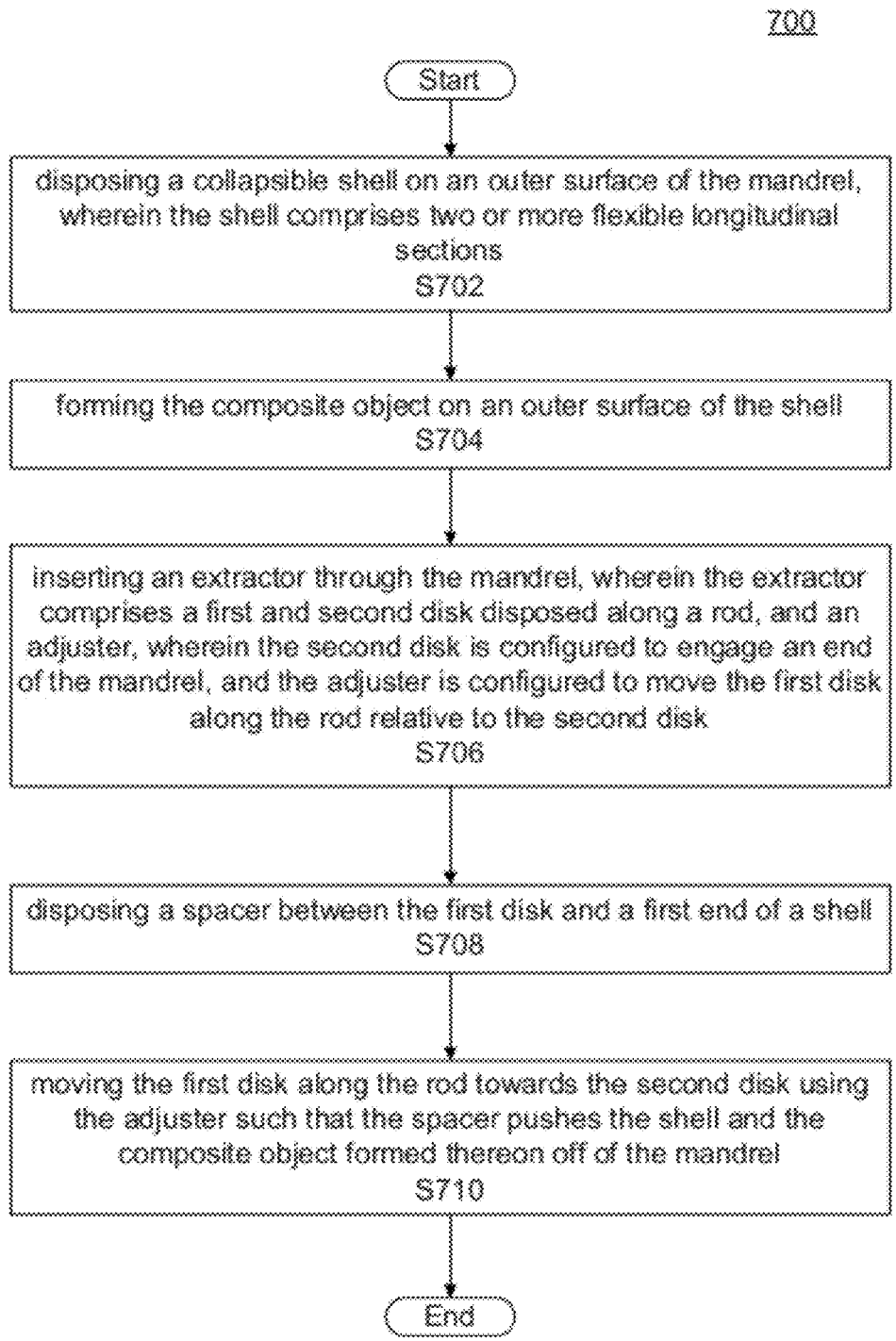
FIG. 7 illustrates an example of a method for removing a cured composite object from a mandrel, in accordance with various aspects of the subject technology.

FIG. 7 illustrates an example of a method 700 for removing a cured composite object from a mandrel, in accordance with various aspects of the subject technology. Method 700 comprises disposing a collapsible shell on an outer surface of the mandrel (S702). The method also comprises forming the composite object on an outer surface of the shell (S704), and inserting an extractor through the mandrel, wherein the extractor comprises a first and second disk disposed along a rod, and an adjuster, wherein the second disk is configured to engage an end of the mandrel, and the adjuster is configured to move the first disk along the rod relative to the second disk (S706). The method further comprises disposing a spacer between the first disk and a first end of a shell (S708), and moving the first disk along the rod towards the second disk using the adjuster such that the spacer pushes the shell and the composite object formed thereon off of the mandrel (S710).

In some aspects, method 700 further comprises guiding a first and second longitudinal section of the shell into a corresponding first and second opening of a disassembly sleeve, wherein the disassembly sleeve removes the first and second longitudinal sections of the shell from the composite object as the spacer pushes the shell and the composite object formed thereon off of the mandrel.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for removing a cured composite object from a mandrel, the system comprising:
   a collapsible shell, wherein an inner surface of the shell is configured to slide over an outer surface of the mandrel and an outer surface of the shell is configured to have the composite object formed thereon;
   an extractor comprising a first and second disk disposed along a rod, and an adjuster, wherein the second disk is configured to engage an end of the mandrel and the adjuster is configured to move the first disk along the rod relative to the second disk; and
   a spacer configured to fit between the first disk and a first end of the shell when the shell is placed on the mandrel, and to push the shell and the composite object formed thereon off of the mandrel when the adjuster moves the first disk towards the second disk.

2. The system of claim 1, wherein the composite object comprises composite fabric and the outer surface of the shell comprises a mold surface for lay-up of the composite fabric.

3. The system of claim 2, wherein the outer surface of the shell comprises a positive draft angle.

4. The system of claim 2, wherein the outer surface of the shell comprises a protrusion.

5. The system of claim 1, wherein the first disk has a diameter that is larger than an outer diameter of the mandrel.

6. The system of claim 1, wherein the second disk has a diameter that is smaller than an outer diameter of the mandrel and larger than an inner diameter of the mandrel.

7. The system of claim 1, wherein the adjuster has a threaded portion adapted to engage the first disk.

8. The system of claim 7, wherein the shell has a longitudinal length and the threaded portion has a threaded length greater or equal to the longitudinal length of the shell.

9. The system of claim 1, wherein an inner surface of the shell comprises channels configured to reduce a contact surface area between the shell and the mandrel.

10. The system of claim 1, wherein the shell comprises at least two flexible longitudinal sections and two or more edges of each longitudinal section are beveled.

11. The system of claim 1, further comprising a disassembly sleeve configured to remove the shell from the composite object as the shell and the composite object are pushed off of the mandrel by the spacer.

12. The system of claim 11, wherein the disassembly sleeve comprises a first and second opening configured to receive a first and second longitudinal section of the shell, respectively.

13. The system of claim 12, further comprising a disassembly ring disposed at a distal portion of the disassembly sleeve and configured to receive a third and fourth longitudinal section of the shell between the disassembly ring and the disassembly sleeve.

14. A method for removing a cured composite object from a mandrel, the method comprising:
   disposing a collapsible shell on an outer surface of the mandrel;
   forming the composite object on an outer surface of the shell;
   inserting an extractor through the mandrel, wherein the extractor comprises a first and second disk disposed along a rod, and an adjuster, wherein the second disk is configured to engage an end of the mandrel, and the adjuster is configured to move the first disk along the rod relative to the second disk;
   disposing a spacer between the first disk and a first end of a shell; and
   moving the first disk towards the second disk using the adjuster such that the spacer pushes the shell and the composite object formed thereon off of the mandrel.

15. The method of claim 14, wherein the composite object comprises a composite fabric and the outer surface of the shell comprises a mold surface for lay-up of the composite fabric.

16. The method of claim 15, wherein the outer surface of the shell has a positive draft angle.

17. The method of claim 15, wherein the outer surface of the shell has a protrusion.

18. The method of claim 14, wherein the adjuster has a threaded portion adapted to engage the first disk.

19. The method of claim 18, wherein the shell has a longitudinal length and the threaded portion has a threaded length greater or equal to the longitudinal length of the shell.

20. The method of claim 14, further comprising guiding a first and second longitudinal section of the shell into a corresponding first and second opening of a disassembly sleeve, wherein the disassembly sleeve pulls the first and second longitudinal sections of the shell away from the composite object as the spacer pushes the shell and the composite object formed thereon off of the mandrel.

* * * * *